July 29, 1947.  H. C. PIERCE  2,424,631
VARIABLE SPEED RAIL CAR MOVER
Filed Sept. 27, 1944  3 Sheets-Sheet 1

INVENTOR.
HAROLD C. PIERCE,
BY
ATTORNEY.

INVENTOR.
HAROLD C. PIERCE,
BY
ATTORNEY.

July 29, 1947.  H. C. PIERCE  2,424,631
VARIABLE SPEED RAIL CAR MOVER
Filed Sept. 27, 1944  3 Sheets-Sheet 3
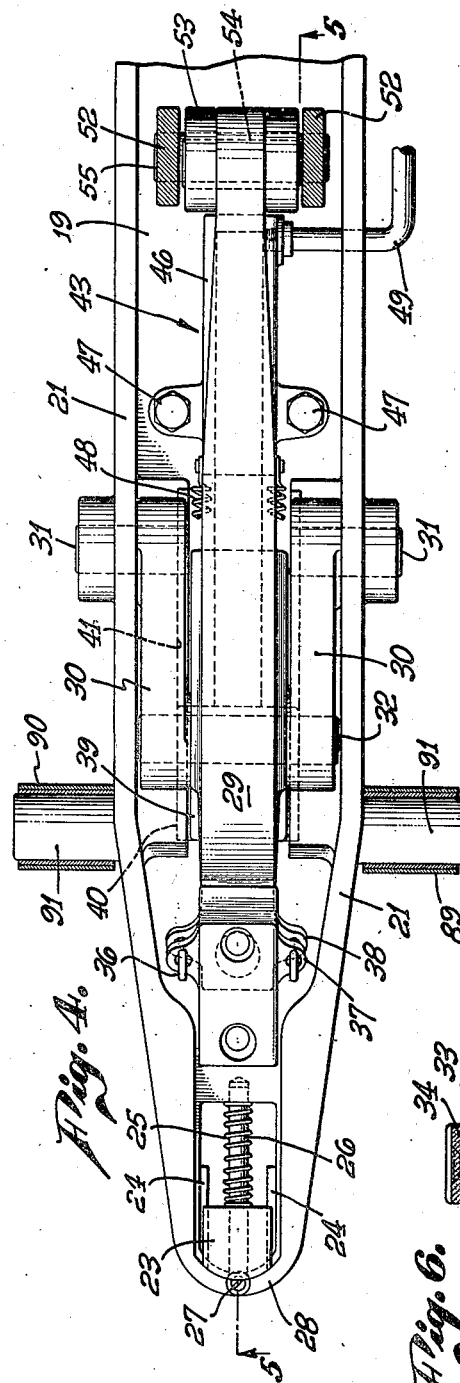
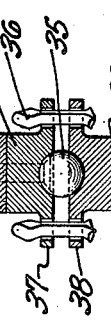
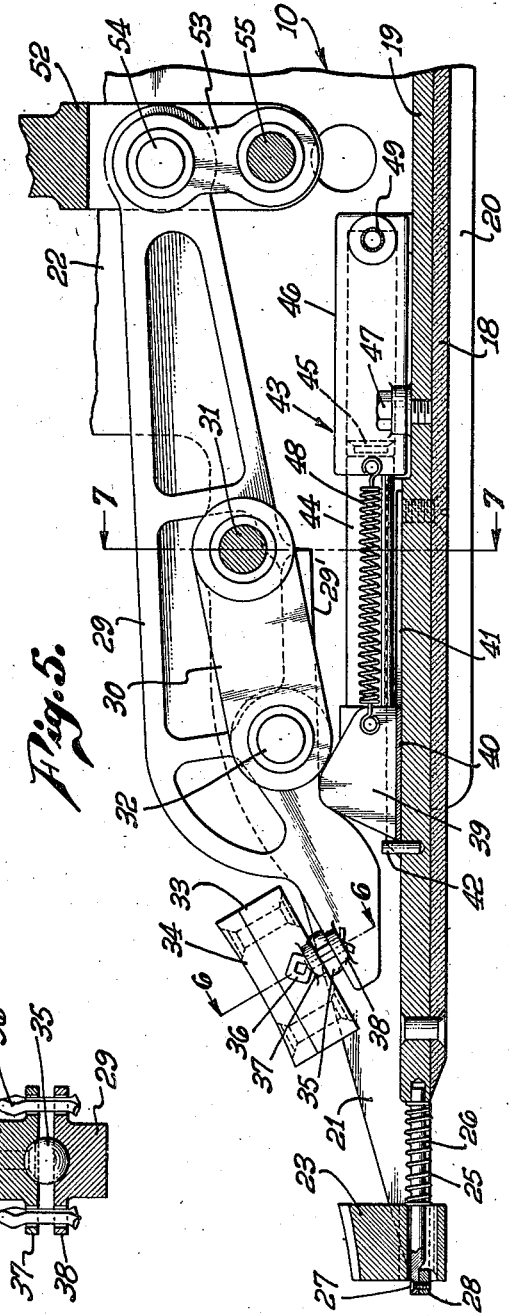
INVENTOR.
HAROLD C. PIERCE,
BY
ATTORNEY.

Patented July 29, 1947

2,424,631

UNITED STATES PATENT OFFICE 2,424,631

VARIABLE-SPEED RAIL CAR MOVER

Harold C. Pierce, Pomona, Calif.

Application September 27, 1944, Serial No. 556,057

13 Claims. (Cl. 254—38)

1

This invention has to do with improvements in rail car moving machines of the general type adapted to be placed upon the track rails and, by virtue of their association with the car wheels and employment of a mechanically powered wheel driving means, to move one or a series of cars along the track. Particularly the invention aims to provide improvements in hydraulic rail car movers of the character disclosed in Patent Number 2,204,000, issued June 11, 1940, to me on Rail car mover.

My primary object is to incorporate in rail car movers of this type, a wheel driving mechanism having variable speed characteristics in that it is capable of developing great wheel rotating power at relatively low effective speed in order to start the car or cars in motion, and thereafter of operating at relatively high effective speed to correspondingly increase the speed of the car set in motion. Preferably I use a wheel driving mechanism comprising an oscillatory lever engageable with the wheel and itself driven by a hydraulically operated power unit, comprising for example a continuously driven pump delivering high pressure fluid under control of a valve mechanism, to a piston which operates the wheel-driving lever.

More particularly, the invention aims to controllably vary the effective wheel rotating speed of the driving lever, by varying the distance of its travel in engagement with the wheel, while maintaining substantially constant the frequency of the lever oscillations. Such control preferably is accomplished by mounting the lever for oscillation on or about a fulcrum which itself is shiftable longitudinally of the lever to vary the arcuate travel of its wheel-engaging end.

The invention further aims to provide, particularly in conjunction with a hydraulically powered drive for the lever, hydraulically actuated means for shifting the lever fulcrum. As will appear, such means may receive operating fluid under pressure developed by the aforementioned pump, under control of a valve which may also control the release of fluid from the fulcrum shifting mechanism to a reservoir.

Various additional objects and features are embodied in the invention, but all these, as well as the details of a typical and preferred form, will be understood from the following description of the accompanying drawings, in which:

Fig. 2 is a fragmentary enlargement of the

Figure 1:
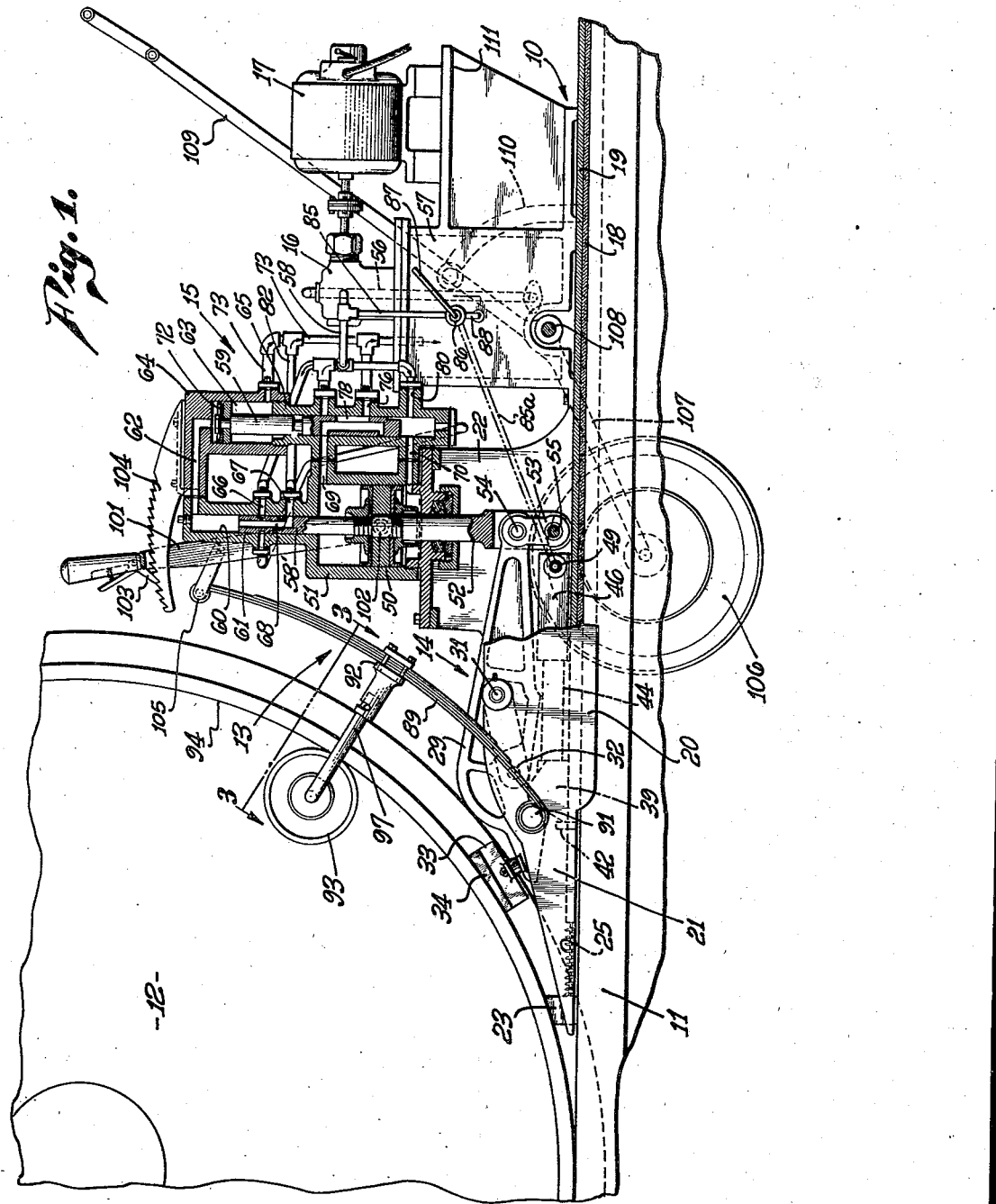
Fig. 1 is a general view showing the rail car mover applied to a car wheel, certain of the parts appearing in cross-sections.
Figure 3:
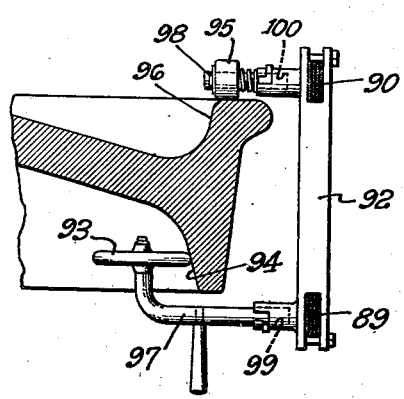

2 power unit with the piston and valves appearing in changed positions;

Fig. 3 is a fragmentary section taken on line 3—3 of Fig. 1;

Fig. 4 is a plan view of the forward portion of the carriage and driving lever;

Fig. 5 is a longitudinal section on line 5—5 of Fig. 4;

Fig. 6 is a fragmentary cross-section on line 6—6 of Fig. 5; and

Figure 7:
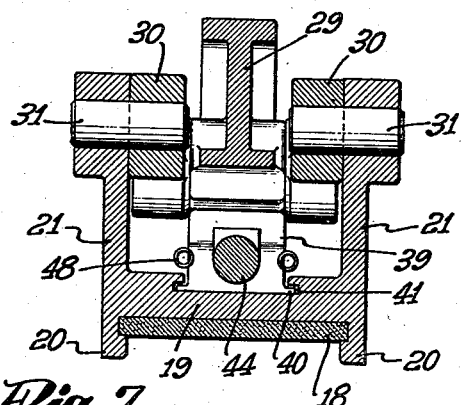

Fig. 7 is a cross-section on line 7—7 of Fig. 5.

Referring first to the general view of Fig. 1, the car mover assembly comprises a carriage, generally indicated at 10, adapted to be set upon the rail 11 and to be attached to the usual car wheel 12 by suitable mechanism 13 so as to slide along the rail and follow the car wheel as the latter is advanced. Mounted on the carriage is a wheel driving mechanism 14 operated by a power unit comprising a hydraulically actuated piston and valve assembly 15 receiving fluid from the pump 16 driven by a suitable electric motor or internal combustion engine 17. The invention is primarily concerned with the wheel driving mechanism 14 and certain associated parts, although for completeness of description, other details of the entire mover assembly will be explained.

The rail surface is engaged by a layer of antifriction material 18 secured to the bottom surface of the carriage base 19 between depending guide flanges 20. The forward end portion of the carriage is channel-shaped, having a pair of upstanding sides 21 extending rearwardly to supports 22 for the piston and valve assembly 15. Referring to Figs. 4 and 5, the forward end of the carriage contains a chock 23 slidable longitudinally on guide flanges 24, rearward movement of the chock relative to the carriage being resisted by coil spring 25 placed about pin 26 extending through the chock and secured at 27 to the forward web 28 of the carriage. The bottom of the chock engages the rail surface, and as the car mover is applied to the wheel 12, the chock may be displaced against the resistance of spring 25 a distance such that as the wheel subsequently is advanced, the chock will follow and at all times engage the wheel surface to prevent reverse rotation.

The driving mechanism 14 comprises a lever 29 positioned between and connected to the carriage sides 21 to permit vertically oscillatory movement of the lever. The lever mounting comprises a pair of links 30 pivoted on the carriage-supported trunnions 31 and pivotally connected to the lever by pin 32 passing through the links and lever. At its forward end, the lever carries a shoe assembly consisting of a block 33 to which is attached a wheel-engaging face of anti-friction material 34. The block is mounted for universal swiveling movement on the lever by means of a ball bearing 35 received within correspondingly shaped recesses in the block and lever. The block is secured to the lever by cotter pins 36 extending through the openings in ears 37 and 38 with sufficient looseness to permit universal swiveling of the block and thereby enable the wheel-engaging shoe to conform with the wheel surface at all positions of the lever.

The lever 29 oscillates on a fulcrum comprising a block 39 slidable on the channel base and carrying a pair of guide flanges 40 received within ways 41 in the sides of the carriage. Fig. 5 shows the fulcrum in its forward position, at which it is arrested by engagement with the stop pin 42. The top of the fulcrum is engageable with a straight undersurface 29' on the lever, along which the fulcrum is shiftable to vary the oscillatory range or thrust of the wheel-engaging end of the lever, by an actuating mechanism, generally indicated at 43. The latter preferably comprises a piston 44 connected to the fulcrum 39 and having an end portion, carrying the packing or cup leather 45, received within a cylinder 46 secured to the carriage base by screws 47. Forward movement of the fulcrum is resisted by a pair of coil springs 48 attached to the fulcrum and a stationary location, such as the sides of the cylinder 46. Fluid communicated to the cylinder through line 49 advances the piston and fulcrum to the limited position of Fig. 5, at which the wheel-engaging lever has its minimum throw. Upon release of the fluid from cylinder 46, springs 48 act to retract the fulcrum and piston to progressively increase the effective throw of the lever.

It is to be understood that in the broader aspects of the invention, the driving member or lever 29 may be operated by any suitable mechanism, although preferably I employ a hydraulic power unit of a kind typified by the mechanism illustrated. The lever 29 is operated by a piston 50 contained within cylinder 51 and having a depending rod 52 bifurcated at its lower end to receive the end of the lever and one or a pair of links 53 pivotally connected at 54 to the lever and at 55 to the piston rod. The piston 50 is actuated by high-pressure fluid, preferably oil of suitable viscosity, discharged through the later described passages by the pump 16. The pump takes suction through line 56 from the oil reservoir 57 and discharges the fluid at high pressure, say from 2,000 to 3,000 pounds per square inch, through line 58 to the piston cylinder under control of the valve mechanism. The latter comprises a piston-operated pilot valve 58' and a master valve 59 operated by fluid pressure in accordance with movements of the pilot valve. The pilot valve comprises a cylindric rod carried by the piston 50 and operating within a bore 60 in the head 61 of the piston cylinder. The upper end of bore 60 communicates by way of passage 62 with a cylindric chamber 63 in block 64 above the master valve body 65. Within the limitation of reciprocation of the piston 50, ports 66 and 67 are alternately placed in the communication with passage 62 and chamber 63 by passage 68 in the pilot valve being brought into registration with ports 66 and 67, as will appear. The master valve body 65 connects by way of passages 69 and 70 with the top and bottom of the piston cylinder 51, and contains an elongated cylindric bore 71 within which the master valve 59 operates. This valve carries at its upper end a plunger or piston 72 operating within chamber 63, the bottom of the chamber below the piston being vented through line 73 to the reservoir 57.

Figure 2:
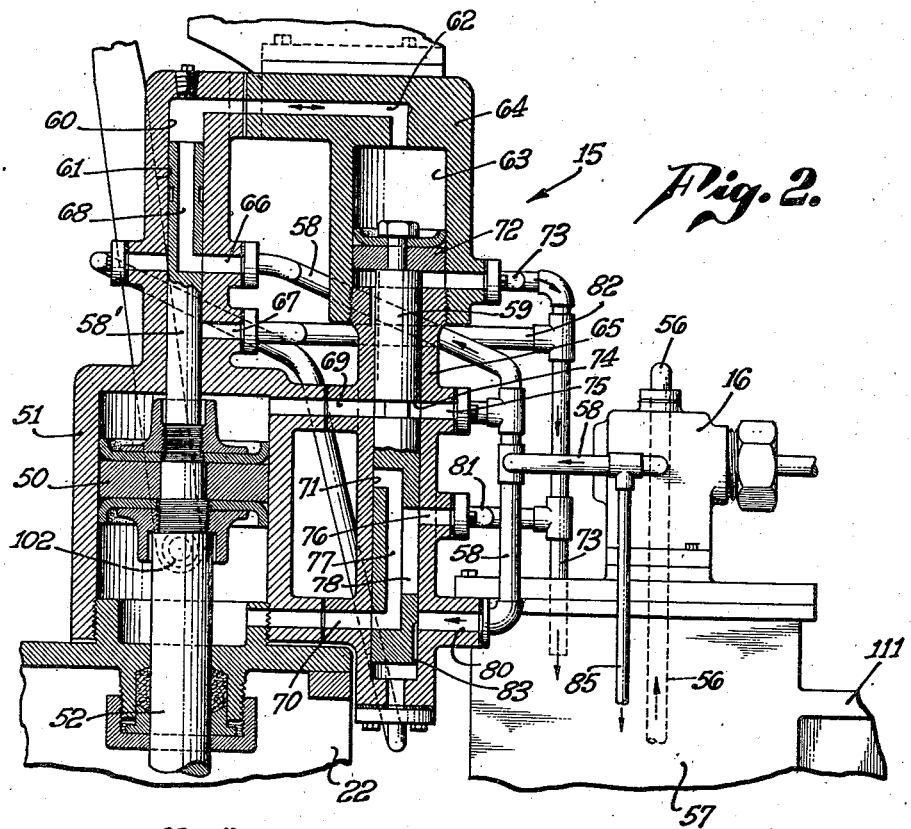

The master valve 59 is provided intermediate its ends with an annular groove 74 adapted to register with passage 69 and port 75, communicating with line 58, when the valve is in its lower position of Fig. 2. Passage 70 is in communication with a port 76 through the valve-contained passage 77 and a longitudinally extending slot 78 in the side of the valve. As shown in Fig. 1, in the upper position of the valve, passage 69 is in communication with port 76 by way of the valve passage 77 and opening 78.

In describing the operation of the lever-actuating piston and valve mechanism, it may be assumed that the piston 50 has reached the limit of its down-stroke and that the master valve 59 is in its raised position, all as shown in Fig. 1. The operating fluid pressure is communicated from the pump 16 through line 58, passage 80, the master valve cylinder and passage 70 into the piston cylinder 51, to move the piston on its up stroke. At this time the cylinder 51 above the piston is vented to the discharge line 73 through passage 69, the valve passages 77 and 78, port 76 and line 81. Chamber 63 above the master valve also is vented to the discharge line 73 through passage 62, bore 60, the valve passage 68, port 67 and line 82. The master valve is maintained in its upper position by the operating fluid pressure applied to its lower end through the port 80. The side of the master valve adjacent port 80 is recessed as at 83 in order that the pump pressure will at all times be maintained against the lower end of the valve.

As the piston 50 moves upward, the pilot valve 61 first closes port 67 and then, within the interval of continued valve movement until the lower end of passage 68 comes opposite port 66, the pilot valve displaces fluid from the valve bore 60 through passage 62 into the master valve chamber 63. Such fluid displacement causes some downward movement of the master valve, but the diameter of the pilot valve bore 60 is made sufficiently small with relation to the diameter of chamber 63, that during the interval within which the pilot valve passage 68 moves out of registration with port 67 into register with port 66, the fluid displacement into chamber 63 will be insufficient to move the master valve to the extent of causing the upper end of its passage 77 to move directly out of communication with passage 69. Therefore, during upward travel of the piston 50, the chamber above the piston will remain vented to the discharge line until the limit of the piston stroke is reached, at which point the master valve is thrown to its lower position in Fig. 3.

Upon upward movement of the pilot valve to the point of bringing passage 68 into communication with port 66, the high pressure operating fluid is discharged from line 58 through passages 68 and 62 into chamber 63, causing the master valve to be moved to its lower position by virtue of the differential in total pressures applied to the piston 72 and the lower end of the valve. Displacement of fluid from bore 71 below the valve resulting from its downward movement, is permitted by reason of the open communication between the valve bore and port 80 through passage 83. When the master valve has moved down to the point of bringing recess 74 into registration with passage 69 and port 75, and the lower end of passage 77 with passage 70, the application of fluid pressure to the piston 50 is reversed, the high pressure from line 58 being communicated through port 75 and passage 69 to the cylinder 51 above the piston, and the chamber below the piston being vented to the discharge line 73 through passages 70, 78, port 76 and line 81. As during upward movement of the pilot valve, the displacement of fluid from chamber 63 into bore 60 during the interval of downward travel of the valve passage 68 between ports 66 and 67, is insufficient to cause upward movement of the master valve to the extent of closing passages 69 and 70, and port 75.

The lever fulcrum 39 and piston 44 are actuated by fluid pressure developed by the pump 16 and communicated to the cylinder 46 through lines 85 and 85a containing a three-way valve 86 suitably operated, as by handle 87, and having a return line connection 88 with the reservoir 57. In one position, the valve 86 permits delivery of fluid to the cylinder 46 to advance the fulcrum 39 to the desired position relative to the lever 29. When the fulcrum is to be retracted under the influence of springs 48, valve 86 is thrown to place line 85a in communication with line 88, thus permitting fluid to be displaced from the cylinder into the reservoir.

The carriage and the entire mechanism supported thereby, is caused to follow the wheel and slide forwardly on the rail by virtue of the connection 13 between the wheel and the carriage. Typically, the connection 13 may comprise a pair of leaf-type springs 89 and 90 mounted at their lower ends on trunnions 91 projecting from the sides 21 of the carriage. Referring to Fig. 3, the springs are interconnected by a clamp bar 92 which carries a roller 93 engaging and riding the inner surface 94 of the wheel flange, and a second roller 95 bearing against the outer surface of the wheel flange 96 to laterally support and stabilize the follower attachment. The rollers are carried on spindles 97 and 98 which are received in sockets 99 and 100 and interchangeable therein to accommodate the follower attachment to a wheel on either rail. The spring tension exerted against roller 93 to maintain it in engagement with the wheel surface 94 is adjusted by a forked lever 101 pivotally mounted at 102 on the sides of the cylinder 51 and carrying a spring-pressed pawl 103 engaging a ratchet 104 supported on the block 64. The upper ends of the springs 89 and 90 are connected to the lever 101 by pivoted links 105.

The car mover may be made conveniently portable by mounting it on a suitable arrangement of ground wheels which may be elevated to enable the carriage to be set down on the rail. Accordingly, the carriage may be supported on a pair of wheels 106, see Fig. 1 (shown for convenience of illustration in their lower positions), mounted at opposite sides of the carriage on a pair of arms 107 journaled to the shaft 108. To set the carriage on the rail, wheels 106 may be swung upward to elevated position about shaft 108 by downward movement of the handle 109. The wheels then may be held in elevated position by suitably latching the handle 109 to an arcuate guide or bracket 110 mounted at the side of the reservoir 57 and motor support 111.

In operation, the car mover is attached to the wheel in the relationship shown in Fig. 1. Here the fulcrum 39 is in its most forward position, giving the greatest mechanical advantage in the transmittal to the wheel of the downward force of the piston 50. As the car is started in motion and the required magnitude of the driving force consequently decreases, valve 86 may be operated to cause retraction of the fulcrum 39, progressively or intermittently to whatever positions desired, with the result that the throw or oscillatory range of the wheel-engaging shoe 34 is correspondingly increased. Since the frequency of the lever oscillation remains constant, the effect of the fulcrum displacement is to cause the wheel to be driven at a faster speed, which may be increased up to the limit of retractive movement of the fulcrum.

I claim:

1. In a rail car moving mechanism, a carriage adapted to be supported on the rail, means forming a fulcrum movable on said carriage longitudinally of the rail, a driving member applicable to the car wheel to rotate same and mounted for oscillation on said fulcrum, and means for shifting said fulcrum relative to the driving member to vary the range of oscillatory thrust of said member against the wheel.

2. In a rail car moving mechanism, a carriage adapted to be supported on the rail, a vertically oscillatory lever applicable to the car wheel to rotate same and mounted on said carriage, a fulcrum slidable on said carriage longitudinally thereof beneath said lever, and means for shifting said fulcrum relative to said lever to vary the range of oscillatory thrust of the lever against the wheel.

3. In a rail car moving mechanism, a movable fulcrum, a driving member applicable to the car wheel to rotate same and mounted for oscillation on said fulcrum, yielding means resisting movement of said fulcrum, and means for shifting said fulcrum relative to the driving member against the resistance of said yielding means to vary the range of oscillatory thrust of said member against the wheel.

4. In a rail car moving mechanism, means forming a fulcrum, a driving member applicable to the car wheel to rotate same and mounted for oscillation on said fulcrum, and fluid pressure actuated means for shifting said fulcrum relative to the driving member to vary the range of oscillatory thrust of said member against the wheel.

5. In a rail car moving mechanism, a movable fulcrum, a driving member applicable to the car wheel to rotate same and mounted for oscillation on said fulcrum, yielding means resisting movement of said fulcrum, and fluid pressure actuated means for shifting said fulcrum relative to the driving member against the resistance of said yielding means to vary the range of oscillatory thrust of said member against the wheel.

6. In a rail car moving mechanism, a carriage adapted to be supported on the rail, a vertically oscillatory lever applicable to the car wheel to rotate same and mounted on said carriage, a fulcrum slidable on said carriage longitudinally thereof beneath said lever, a piston mounted on said carriage and operable to shift said fulcrum relative to the lever, and fluid pressure control means for actuating the piston.

7. In a rail car moving mechanism, a carriage adapted to be supported on the rail, means forming a fulcrum movable on said carriage longitudinally of the rail, a lever mounted for oscillation on said fulcrum and applicable to the car wheel to rotate same, a piston and cylinder on the carriage below the lever and operable to shift said fulcrum relative to the lever, and means for supplying pressure fluid to said piston and cylinder.

8. In a rail car moving mechanism, a channel-shaped carriage adapted to be supported on the rail, a fulcrum movable longitudinally of the base of the carriage, a wheel-engaging lever pivotally mounted on the channel sides of the carriage for oscillatory movement on said fulcrum, and fluid pressure actuated means for shifting said fulcrum relative to the lever longitudinally of said carriage.

9. In a rail car moving mechanism, an oscillatory driving member applicable to the car wheel to rotate same, means actuated by the pressure of a fluid for operating said member, and means actuated by the pressure of said fluid and operable to vary between different predetermined limits the range of oscillatory movement and thrust of said member against the wheel.

10. In a rail car moving mechanism, means forming a fulcrum, a driving member applicable to the car wheel to rotate same and mounted for oscillation on said fulcrum, a pump, means actuated by fluid pressure developed by the pump for operating said member and means actuated by said fluid pressure for shifting said fulcrum relative to the driving member to vary the range of oscillatory thrust of said member against the wheel.

11. In a rail car moving mechanism, means forming a fulcrum, a driving member applicable to the car wheel to rotate same and mounted for oscillation on said fulcrum, a pump, a reservoir from which fluid is taken to the pump, means actuated by fluid pressure developed by the pump for operating said member, means actuated by said fluid pressure for shifting said fulcrum relative to the driving member, and valve controlled means for discharging fluid from said fulcrum shifting means to the reservoir.

12. In a rail car moving mechanism, a carriage adapted to be supported on the rail, means forming a fulcrum movable on said carriage longitudinally of the rail, a lever mounted for oscillation on said fulcrum and applicable to the car wheel to rotate same, a piston and cylinder on the carriage below the lever and operable to shift said fulcrum relative to the lever, a pump a reservoir from which fluid is taken by the pump, means actuated by fluid pressure developed by the pump for operating said lever, and valve controlled means for selectively communicating said fluid pressure to said cylinder and for discharging fluid from the cylinder to said reservoir.

13. A rail car moving mechanism comprising a channel-shaped carriage movable on and along the rail, an oscillatory driving member mounted on said carriage and engageable with the car wheel to rotate same, a pair of pivotally movable links connecting said member with the sides of the carriage channel, means for actuating said member, and control means mounted on the carriage and operable to vary the oscillatory travel of the wheel-engaging portion of said member.

HAROLD C. PIERCE.

REFERENCES CITED

The following references are of record in the file of this patent:

UNITED STATES PATENTS

| Number | Name | Date |
|---|---|---|
| 762,898 | Gehr | June 21, 1904 |
| 1,994,530 | Miehe | Mar. 19, 1935 |
| 2,204,000 | Pierce | June 11, 1940 |
| 2,119,567 | Williams | June 7, 1938 |

FOREIGN PATENTS

| Number | Country | Date |
|---|---|---|
| 438,650 | Great Britain | Nov. 20, 1935 |
| 630,789 | France | Aug. 29, 1927 |